United States Patent [19]
Hadnot

[11] 3,780,466
[45] Dec. 25, 1973

[54] DEVICE FOR HOLDING FISHING RODS

[76] Inventor: Leroy Hadnot, 2715 May St., Cincinnati, Ohio 45206

[22] Filed: Jan. 14, 1972

[21] Appl. No.: 217,804

[52] U.S. Cl. .................................. 43/17, 280/47.19
[51] Int. Cl. ............................................ A01k 97/12
[58] Field of Search ............................... 43/17, 16; 280/47.17, 47.19, 47.24

[56] References Cited
UNITED STATES PATENTS

| 3,546,805 | 12/1970 | Schaeffer | 43/17 |
| 3,020,664 | 2/1962 | Snyder et al. | 43/17 |
| D143,971 | 2/1946 | Jessen | 280/47.19 X |

*Primary Examiner*—Antonio F. Guida
*Assistant Examiner*—Daniel J. Leach
*Attorney*—Edward J. Utz

[57] ABSTRACT

A device for carrying and holding a plurality of fishing rods so that the movement of the fishing rods cause a signaling device to be actuated. The device comprises a frame having a pair of wheels at one end thereof and a cross member with sockets therein to receive the rod handles. Each rod shaft is positioned over a spring mounted pistion which actuates the signal device.

1 Claim, 4 Drawing Figures

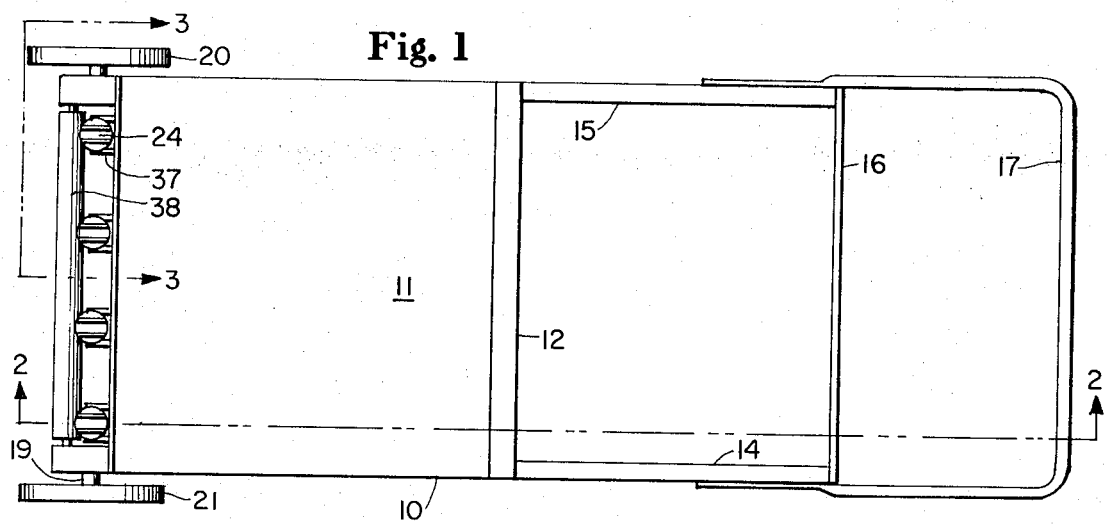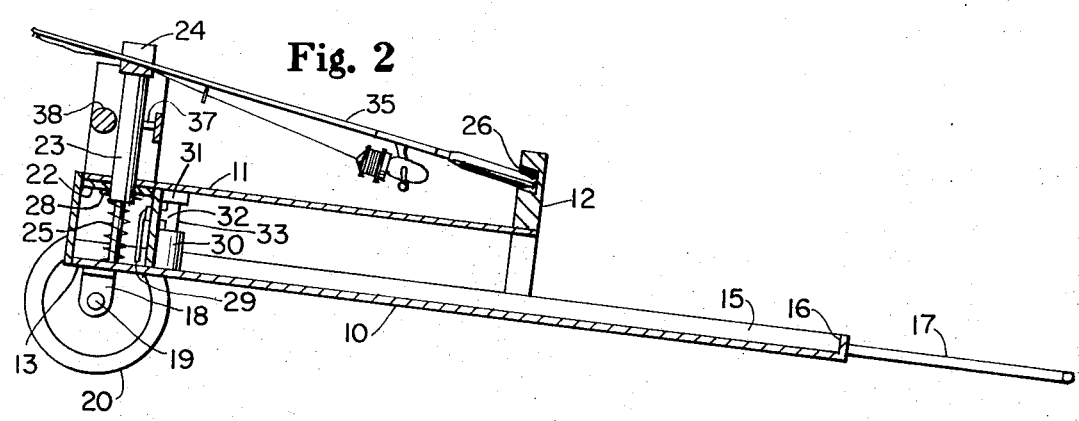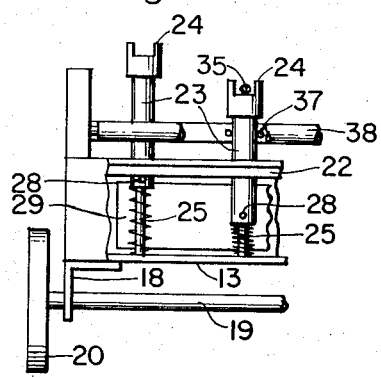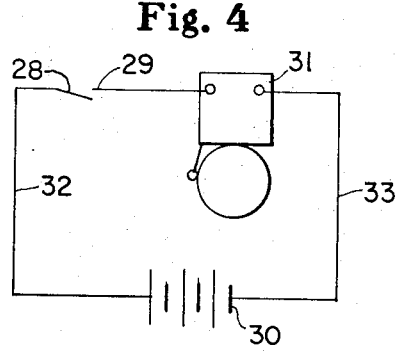

DEVICE FOR HOLDING FISHING RODS

My invention relates to a device for holding a plurality of fishing rods and is so constructed that a movement of the fishing rod will cause the signaling device carried within the structure to be actuated.

The principal object of my invention is to provide a carriage device having a carrying member constructed to receive one or a plurality of fishing rods and to securely hold said fishing rods and which are responsive to slight movement to actuate a signaling device.

Another object of my invention is to provide a structure having a pair of wheels attached to a frame and a handle member for moving said structure.

Still another object of my invention is a device having a spring loaded member which carries the rod portion of a fishing rod and reel and which is responsive to slight movement to actuate a signaling device.

In the drawings of my invention,

FIG. 1 is a plan view of the structure of my invention,

FIG. 2 is a detail sectional view taken along the lines 2—2 of FIG. 1,

FIG. 3 is a detailed sectional view taken along the lines 3—3 of FIG. 1, and

FIG. 4 is a wiring diagram of the signaling device.

In the drawings the same reference numerals refer to the same parts throughout the several views and the sectional views are taken looking in the direction of the arrows at the ends of the section lines.

In general my invention consists of a frame structure having secured to it at one end a handle and being secured to an axle at the other end to which a pair of wheels are attached. Adjacent to the wheel portion, I have mounted a carriage mounting for receiving one or more fishing rods. The holder member of the carriage mounting is movable against a spring and has a member which when moved in a downward position closes a circuit to actuate a bell or other signaling mechanism.

It is apparent that by using my invention a plurality of fishing rods may be secured within the carriage and when anyone of the fishing rods is moved by the action of the fish the signal device will be actuated and the fisherman or attendant at my device can then operate the rod and reel as he desires. It should be pointed out that by varying the tension of the various springs mounted in the carriage a variety of forces may be required to effect a signal. This will depend upon the type of fish being sought.

Referring now to the numbered parts of the drawings, I show in FIG. 1 a frame 10 having a bed portion 11 secured by cross-members 12 and 13. A pair of extension members 14 and 15 are secured to cross-member 12 and to cross-member 16. The extension members 14 and 15 have affixed thereto a handle 17.

The front portion of the frame 10 is provided with a pair of angle members 18 which carry axle 19 to which are secured a pair of wheels such as 20 and 21.

The frame 10 also carries a carriage mounting 22 which is provided with a series of pistons such as 23 which carry guide members such as 24. At the lower end of each piston 23 I provide a spring 25 which is adapted to be compressed.

The cross-member 12 is provided with a series of inclined sockets such as 26 which receive the end of the fishing rod and the pull on the fishing line causes the rod to force the particular piston downwardly.

Each piston is provided with a projecting member 28 which operates in a downward position to close a circuit by contacting a switch 29. The switch 29 is connected to a power source 30 and to a signaling device 31 through leads 32 and 33. A portion of a fishing rod 35 is shown. A cross member 38 is located above the wheels 20 and 21 and a piston guide member 37 spaced from said member 38 serves to guide the pistons such as 23.

Therefore, it is readily apparent that sufficient pull upon the extended fishing rod bottomed in the socket 26 and secured in guide 24 will depress piston 23 to a sufficient depth to close a circuit to activate a signal device such as bell 31. My invention is not limited to a bell device since it may be desired to actuate other signal means located at a distance from the device other than on the frame.

Having thus described my invention what I desire to secure by United States Letters Patent is, I claim:

1. In a device for holding fishing rods having a frame, the combination of a pair of wheels on one end of said frame, a handle on the opposite end of said frame, a carriage mounted on said frame adjacent to the end having a pair of wheels, a first cross member on said carriage and having a plurality of sockets for receiving the handles of fishing rods, a second cross member located above the said pair of wheels, a piston guide member spaced from said second cross member, a plurality of spring mounted pistons carried between said second cross member and said guide member, each of said pistons having a grooved head portion in line with a corresponding socket to receive the shaft of a fishing rod, and a signal device actuated by the movement of said piston in response to the pull on said fishing rod.

* * * * *